United States Patent
Pelletier et al.

(10) Patent No.: US 7,327,959 B2
(45) Date of Patent: Feb. 5, 2008

(54) CAMERA-MOUNTABLE FIBER OPTIC TRANSCEIVER SYSTEM

(75) Inventors: David C. Pelletier, Southbridge, MA (US); Eugene E. Baker, Worcester, MA (US); James B. Hurwitz, Mill Valley, CA (US)

(73) Assignee: Telecast Fiber Systems, Inc., Worcester, MA (US)

( * ) Notice: Subject to any disclaimer, the term of this patent is extended or adjusted under 35 U.S.C. 154(b) by 565 days.

(21) Appl. No.: 10/023,452

(22) Filed: Dec. 17, 2001

(65) Prior Publication Data
US 2003/0112338 A1 Jun. 19, 2003

(51) Int. Cl.
*H04B 10/00* (2006.01)
*H04N 5/225* (2006.01)
*H04N 5/38* (2006.01)
*H04N 5/44* (2006.01)

(52) U.S. Cl. ............... 398/139; 398/135; 398/138; 348/373; 348/723; 348/725; 348/730

(58) Field of Classification Search ........ 398/135, 398/138, 139; 348/207.99, 211.2, 373, 374, 348/211.1, 211.3, 723, 725, 724, 726, 730, 348/207
See application file for complete search history.

(56) References Cited

U.S. PATENT DOCUMENTS

| | | |
|---|---|---|
| 4,218,107 A | 8/1980 | Wilson .................. 339/75 P |
| 4,300,166 A | 11/1981 | Marey |
| 4,894,819 A | 1/1990 | Kondo et al. |
| 5,023,725 A | 6/1991 | McCutchen |
| 5,057,932 A | 10/1991 | Lang |
| 5,068,720 A | 11/1991 | Herlitz et al. |
| 5,132,828 A | 7/1992 | Conner et al. |
| 5,150,442 A * | 9/1992 | Desmons ................ 385/101 |

(Continued)

FOREIGN PATENT DOCUMENTS

JP 57013829 A 1/1982

(Continued)

OTHER PUBLICATIONS

Product Brochure, "PCI RCI System," Fiber Optic Extender for Camera Link or LVDS (AIA) C.*

(Continued)

*Primary Examiner*—M. R. Sedighian
(74) *Attorney, Agent, or Firm*—Brian M. Dingman; Mirick O'Connell, DeMaillie & Lougee

(57) ABSTRACT

A system includes a multiplexing transceiver which is adapted to mount directly between a video camera and a camera battery pack, eliminating the need for triaxial adapters or other electrical cables at the camera and video production facility. A fiber optic cable carries upstream and downstream television signals between the camera-mountable transceiver and a remote base station transceiver. The camera-mountable transceiver includes a transmitter adapted for converting an electrical information input signal received from the camera to an optical output signal. The transceiver further includes a receiver adapted for converting an optical input signal received from the fiber optic cable to an electrical information output signal. A transceiver housing includes a first plate on a first side for mounting the housing to the camera and a second plate on a second side for mounting the housing to a power source.

18 Claims, 9 Drawing Sheets

U.S. PATENT DOCUMENTS

| | | | |
|---|---|---|---|
| 5,162,937 A | 11/1992 | Heidemann et al. | 359/124 |
| 5,164,839 A | 11/1992 | Lang | |
| 5,345,592 A | 9/1994 | Woodmas | 455/3.3 |
| 5,347,601 A | 9/1994 | Ade et al. | |
| 5,469,211 A * | 11/1995 | Maruichi et al. | 348/211.2 |
| 5,541,758 A | 7/1996 | Matsuo et al. | |
| 5,544,315 A | 8/1996 | Lehfeldt et al. | |
| 5,568,205 A * | 10/1996 | Hurwitz | 348/723 |
| 5,570,220 A | 10/1996 | Matsumoto et al. | |
| 5,572,348 A | 11/1996 | Carlson et al. | 359/125 |
| 5,642,160 A * | 6/1997 | Bennett | 348/156 |
| 5,701,581 A | 12/1997 | Eto et al. | 455/5.1 |
| 5,748,348 A | 5/1998 | Heidemann et al. | 359/125 |
| 5,774,754 A * | 6/1998 | Ootsuka | 396/380 |
| 5,793,506 A | 8/1998 | Schmid | 359/125 |
| 5,847,753 A | 12/1998 | Gabello et al. | |
| 6,035,085 A | 3/2000 | Berger | |
| 6,115,159 A * | 9/2000 | Baker | 398/1 |
| 6,262,767 B1 * | 7/2001 | Wakui | 348/211.99 |
| 6,665,497 B1 | 12/2003 | Hamilton-Gahart et al. | |
| 6,947,069 B1 * | 9/2005 | Elberbaum | 348/50 |
| 6,947,092 B1 * | 9/2005 | Nagata et al. | 348/360 |
| 2002/0071035 A1 | 6/2002 | Sobol | |
| 2002/0164115 A1 | 11/2002 | Watanabe | |
| 2003/0112363 A1 * | 6/2003 | Oliver | 348/375 |
| 2003/0117499 A1 | 6/2003 | Bianchi et al. | |

FOREIGN PATENT DOCUMENTS

| JP | 57173237 A | | 10/1982 |
|---|---|---|---|
| JP | 357173237 A | * | 10/1982 |
| JP | 03071737 A | | 3/1991 |
| JP | 2001057536 A | | 2/2001 |

OTHER PUBLICATIONS

Product Description, "The Mongoose CSV, www.cove-industries.co.uk/Broadcast/mongoose.htm" Oct. 29, 2001.*
Product Brochure, "Cobra™ Fiber Optic Triax Camera Extender," *Telecast Fiber Systems, Inc.*, 1997.
Product Brochure, "DiamondBack™ 8-Channel Fiber Optic Video/Audio Multiplexer," *Telecast Fiber Systems, Inc.*, 2001.
Product Brochure, "Viper™ Fiber Optic Video/Audio/Intercom/Data System," *Telecast Fiber Systems, Inc.*, 1998.
Product Description, "Camplex CP-302B-S1 System," www.camplex.com/s-1.htm (downloaded Nov. 16, 2001).
Product Description, "CP-501 Component Multiplex System," www.camplex.com/501info.htm (downloaded Nov. 16, 2001).
Product Brochure, "DynaPix Wireless Video Systems, VTX/SVTX Video Transmitters", *DTC Communications, Inc.*, 1998.
Product Description, "The Mongoose CSV," www.cove-industries.co.uk/Broadcast/mongoose.htm (downloaded Oct. 29, 2001).
Product Brochure, "Fiber Optic Transceivers", Manufactured by American Fibertek, Mar. 2001.
Product Brochure, "PCI RCI System," Fiber Optic Extender for Camera Link or LVDS (AIA) C, http://www.edt.com/pci_rci.html (downloaded Apr. 15, 2004).
Product Brochure, "Panasonic Ideas for Life," 2004, http://www.panasonic.com/business/security/fiberoptics.asp (downloaded Apr. 15, 2004).
"SMPTE Standard for Television—Broadcast Cameras—Hybrid Electrical and Fiber-Optic Connector," ANSI/SMPTE 304M-1998, Aug. 1998.

* cited by examiner

CAMERA-MOUNTABLE FIBER OPTIC TRANSCEIVER SYSTEM

BACKGROUND

In the television broadcast industry, there are several types of television production methodologies, including electronic news gathering/satellite news gathering (ENG/SNG), electronic field production (EFP) and outside broadcast (OB). ENG/SNG applications typically feature a single camera with a built-in video tape recorder (VTR) which is most often used as a stand-alone camcorder for recording live events locally to tape. FIG. 1 shows a prior art camera system 12. This camera can also serve as a "live" camera from the scene of the news event. At that point, it is commonly connected to a video production vehicle control center 11 via either copper cables or coaxial cables 17.

In the copper cable approach, the camera is connected to the truck with multiple copper cables which typically include one-to-three coax cables with BNC connectors for video signals and one-to-four shielded twisted audio pairs with XLR connectors for audio and intercom signals as well as power if the camera is not powered by a local battery. Alternatively, a minority of crews make use of products which multiplex all of the required signals, as well as power, over a single coax cable. U.S. Pat. No. 5,345,592 discloses such a system.

In Electronic Field Production (EFP), multiple cameras connect to a "production center" (usually a small truck) via copper cables or coax, or via another cable, known as "multicore." Multicore is a 26-conductor cable that carries power and all of the required signals over discreet copper wires. Multicore is limited in distance, and is heavy, inflexible, expensive, and hard to repair in the field.

Outside Broadcast (OB) features multiple cameras (three or more) serviced by cameras with triaxial capability. This application includes sports, live music concerts, scripted programs shot outside of studios, and other shows where large crews shoot action that is confined within a prescribed area and is fairly predictable. The OB camera can be remotely controlled and powered from a local or distant camera control unit (CCU), sometimes called a base station, through a transmission medium known as triaxial cable.

The triaxial cable is a shielded coaxial cable designed to simultaneously transmit various bi-directional information and/or control signals and provide power from the CCU to the camera. Signals typically may include program video (component, composite, serial digital interface, high definition or other), program audio, return video, viewfinder video, genlock, return audio, IFB (interrupt foldback), Teleprompter, tally, call, intercom, and bi-directional camera control data. These signals may be analog, such as AM or FM, and/or digital in nature. Power may be in the form of AC or DC. Since there is typically only one physical cable, it is the function of the camera system's triaxial adapter to encode and/or modulate the required video, audio, intercommunications and data signals onto the proper frequencies. These frequencies are typically frequency division multiplexed for transmission, with assigned frequencies traveling in their specified directions on the triaxial cable. Other techniques, such as digital hybrid transmission, may also be used in addition to frequency division multiplexing techniques. The triaxial adapter demodulates the composite signal at either of the receiving ends of the triaxial cable into the respective baseband signals. The triaxial adapter may be contained within the camera and/or CCU ends, or may be separate units that attach to the camera and/or CCU ends.

Since the information signals are typically high frequency broadband RF signals, the effective distance over which the camera and CCU can communicate and operate is limited to one to three kilometers. In addition, a trend in the industry has been towards cameras having higher performance and wider information bandwidths, thus further limiting the distance of a wideband, component triaxial camera system to approximately one kilometer. In order to compensate, users may utilize a larger, heavier cable, which may increase distance, but also increases time and labor to deploy and take up the cable. This distance limitation often interferes with the user's ability to produce the desired programming.

Some camera manufacturers provide a fiber optic interface directly on the camera and on the CCU. However, these solutions can require significant investments in new cameras, CCUs and supporting infrastructure.

Video cameras for ENG or EFP applications typically are equipped with a specialized battery mount that provides a rugged, secure and reliable attachment of the battery to the camera. Known systems for battery mounting include Anton/Bauer, PAG, and Sony V-mount.

SUMMARY

There is a need in the broadcast industry to enhance the operating distance of cameras, especially in electronic news gathering (ENG), satellite news gathering (SNG) and electronic field production (EFP) applications, without having to modify the camera and control hardware and without the need for costly investments in supporting infrastructure. There is also a need for such enhancements to provide a compact, convenient and secure mounting arrangement.

The above and other problems are solved by the camera-mountable fiber optic transceiver system of the present approach. The system includes a multiplexing transceiver which is adapted to mount directly between a video camera and a camera battery pack, eliminating the need for triaxial adapters or other electrical cables at the camera and remote equipment. A fiber optic cable carries upstream and downstream television signals between the camera-mountable transceiver and a remote base station transceiver. Fiber optic cable combines the advantages of increasing distance with smaller, lightweight cabling. Fiber optic cable eliminates all types of electromagnetic and radio frequency interference as well as ground faults and hum. With transparency, bandwidth and small cable size, the present system can deliver television signals at thirty times the distance of ordinary coaxial or triaxial cable type systems.

Accordingly, a transceiver of the present system provides an interface between a camera and a fiber optic cable. The transceiver includes a transmitter adapted for converting an electrical information input signal received from the camera to an optical output signal. The transceiver further includes a receiver adapted for converting an optical input signal received from the fiber optic cable to an electrical information output signal. The electrical information signals can include video, audio and data signals.

A housing that holds the transmitter and receiver is adapted for mounting to the camera. In an embodiment, the housing includes a first plate on a first side for mounting the housing to the camera, and a second plate on a second side for mounting the housing to a battery or other power source. Power is passed from the battery to the camera through the housing, and tapped off to power the transceiver. In some embodiments, the plates for mounting the housing are compatible with standard battery mounts which avoids the need to modify the cameras to support the transceiver.

According to an aspect of the system, the transmitter includes a multiplexer for multiplexing plural camera information signals to a multiplexed electrical input signal and an electrical-to-optical converter for converting the multiplexed electrical input signal to the optical output signal.

According to another aspect of the system, the receiver includes an optical-to-electrical converter that converts the optical input signal to a multiplexed electrical signal and a demultiplexer for demultiplexing the multiplexed electrical signal to plural remote information signals.

According to another aspect of the present approach, a system includes a camera-mountable optical transceiver for transmitting a downstream optical signal and for receiving an upstream optical signal; a remote optical transceiver for transmitting the upstream optical signal and for receiving the downstream optical signal; and a fiber optic cable coupled between the camera-mountable optical transceiver and the remote optical transceiver for carrying the downstream and upstream optical signals. The camera-mountable optical transceiver includes a housing for mounting to the camera.

The present system has particular applicability for ENG, SNG and other events where the events themselves may be some distance from the production base station. The present system further saves time and labor in arranging outside broadcast events. Use of fiber optic cables can eliminate more than 90% of the typical cable weight of copper cables. The system can also be used in metropolitan applications, directly linking remote venues to production studio via leased "dark fiber" (replacing microwave links), and in pre-fibered venues and campuses, avoiding the need to pull copper cables.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 2A:
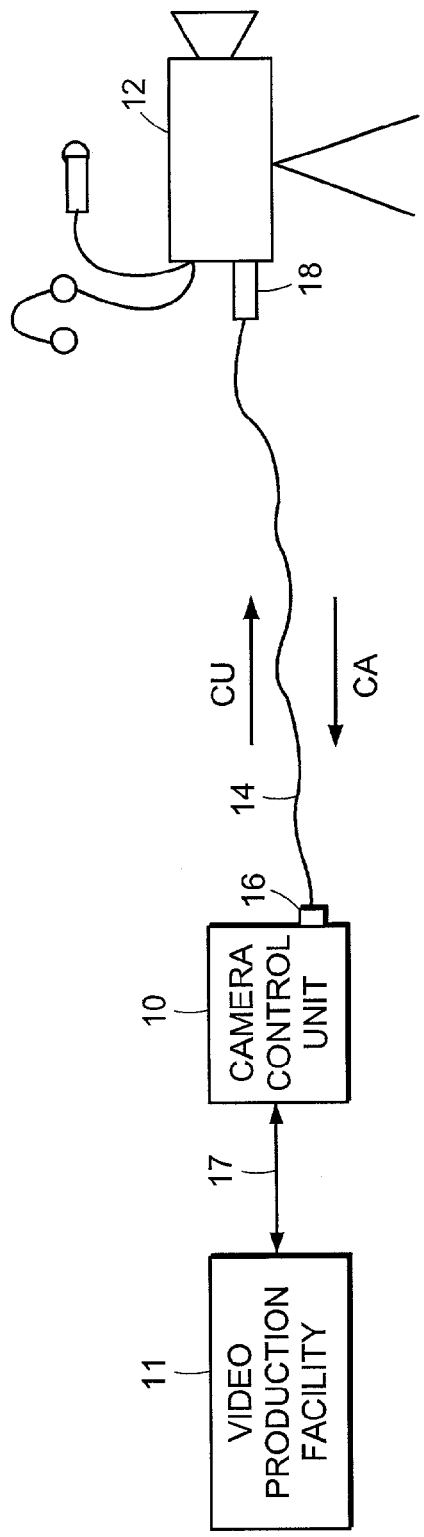
FIG. 2A is a diagram of another prior art camera control system.

A prior art camera control system is shown in FIG. 2A. The system includes a camera control unit (CCU) 10 linked to a camera 12 using a cable 14. The CCU 10 and the camera 12 each include a connector 16, 18 respectively for coupling television program signals to the cable 14. Specifically, the CCU 10 transmits program signal CU and the camera 12 originates program signal CA. The signals CU and CA may include, for example, program video, return video, viewfinder video, gen-lock, intercom and other audio program signals. The cable 14 can be copper, coaxial, triaxial or multicore type. The CCU 10 connects the multiple signals CU, CA over multiple cables 17 to a video production facility 11.

Note that a camera control panel (not shown) may also be included, either integral with the CCU 10, or more commonly, mounted separately and connected to the CCU.

In a triaxial type system, the electrical signals CA and CU are conventional television signals typically arranged in a frequency division multiplex (FDM) format of the individual video, audio, and control signals which in aggregate have a typical bandpass of about 100 MHz.

Figure 1:
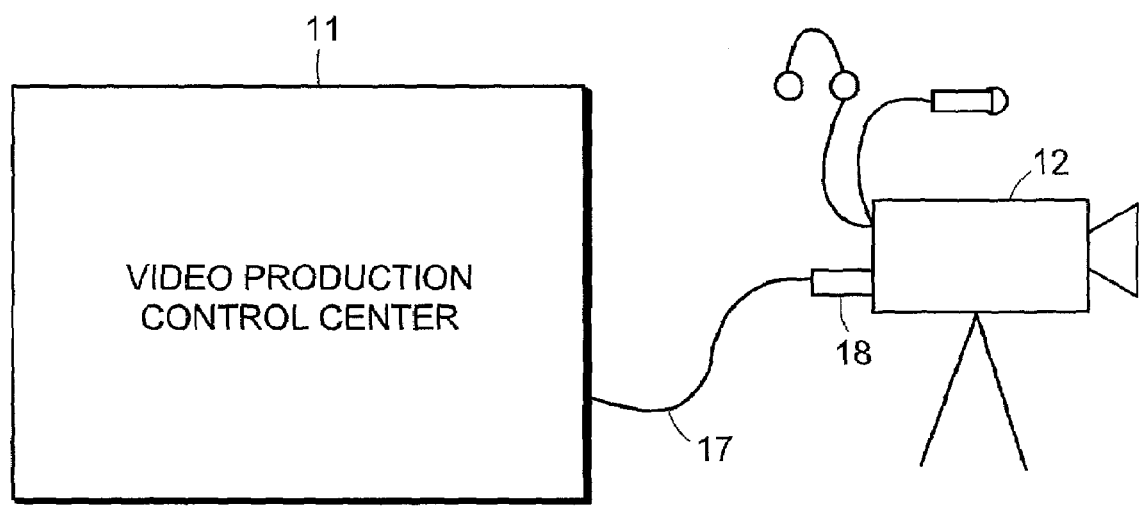
FIG. 1 is a diagram of a prior art camera control system.
Figure 2B:
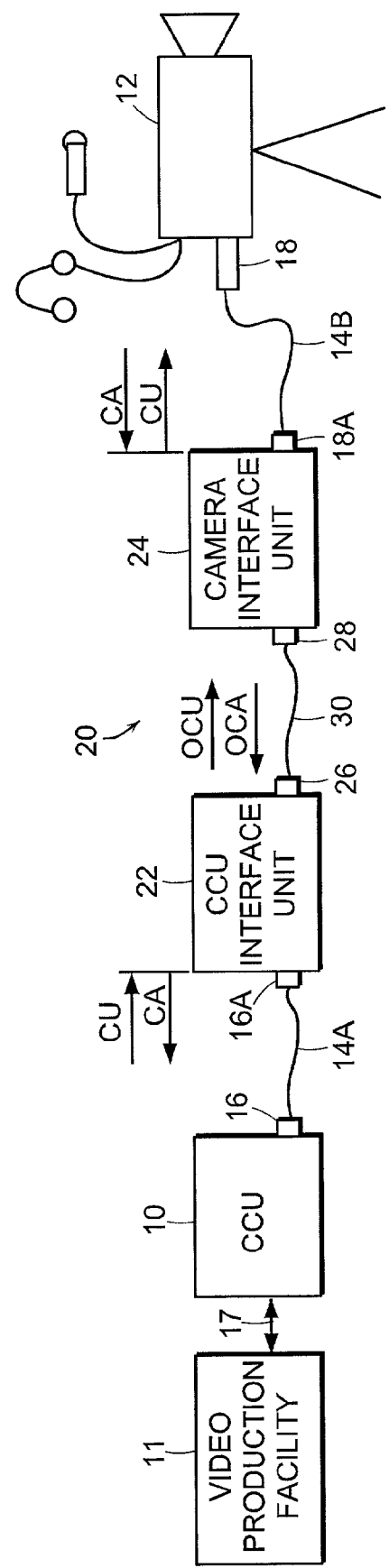
FIG. 2B is a diagram of a fiber optic triaxial camera control system.

FIG. 2B shows a fiber optic triaxial camera control system 20 such as that disclosed in U.S. Pat. No. 6,115,159, the contents of which are incorporated herein by reference. The system 20 generally comprises a camera control interface unit 22, a camera interface unit 24, and a fiber optic cable 30. The control interface unit 22 is linked to CCU 10 using a section of standard triaxial cable 14A. Similarly, the camera interface unit 24 is linked to camera 12 using a triaxial cable section 14B. Similar to FIG. 1, multiple signals CU, CA are connected between the CCU 10 and the video production facility over multiple cables 17.

The control interface unit 22 and the camera interface unit 24 each provide an electro/optical and opto/electrical conversion function. The control interface unit 22 converts FDM signal CU received on triaxial cable 14A to provide optical signal OCU on fiber optic cable 30. The optical signal OCU is transmitted on fiber optic cable 30 to the camera interface unit 24 where it is converted back to electrical FDM signal CU and coupled to the triaxial cable 14B and passed to camera 12. In a similar manner, the camera interface unit 24 converts FDM signal CA received from the camera 12 on triaxial cable 14B to provide optical signal OCA which is transmitted on fiber optic cable 30 to the control interface unit 22. The control interface unit 22 converts the optical signal OCA back to electrical FDM signal CA for transmission to the CCU 10 on triaxial cable 14A.

Figure 3A:
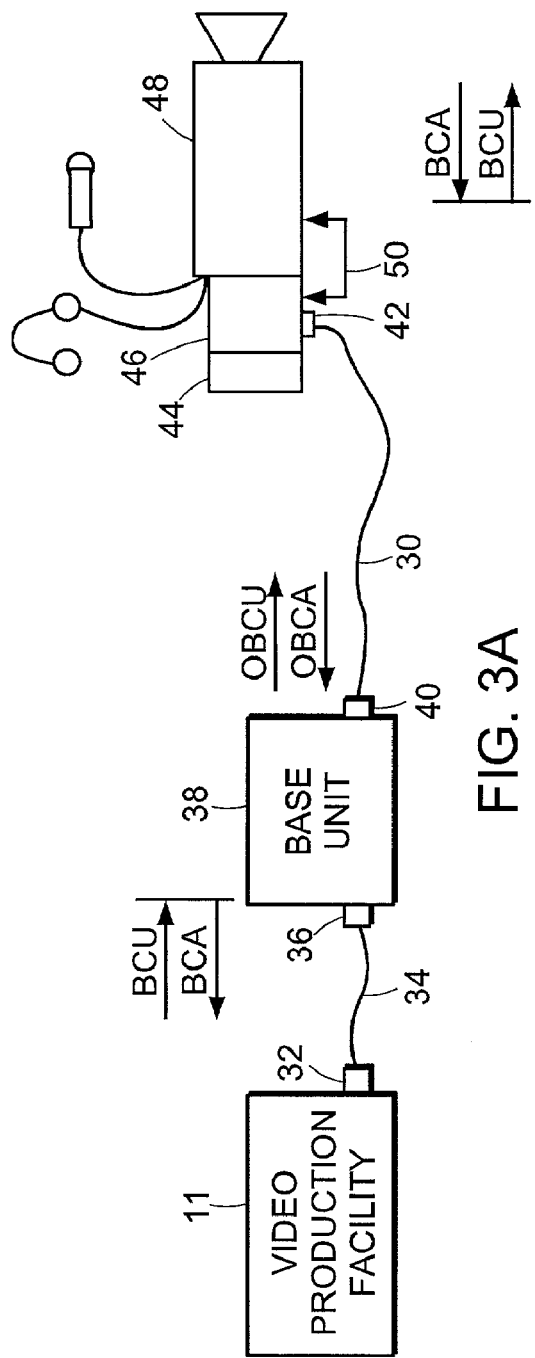
FIG. 3A is a diagram of a camera-mountable fiber optic transceiver system of the present approach.

FIG. 3A shows a diagram of a system of the present approach that includes a camera transceiver unit 46 and a base station transceiver unit 38. The camera transceiver unit is mounted between a camera 48 and a battery or other power supply 44. The base station transceiver unit is coupled to a remote video production facility 11. The camera transceiver unit is connected to the base station transceiver unit by a fiber optic cable 30. The fiber optic cable is multimode or single mode optical fiber.

Figure 3B:
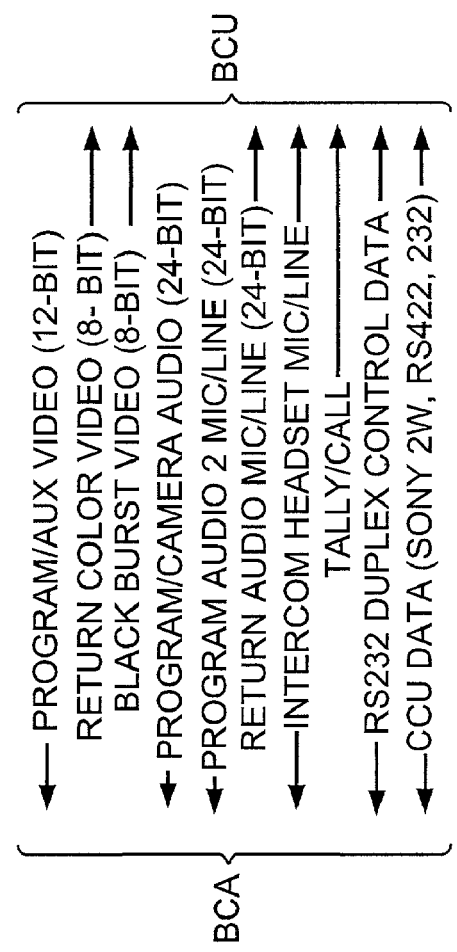
FIG. 3B shows the type of signals carried by the system of FIG. 3A.

Rather than dealing with FDM formatted signals, the present system operates directly with baseband television signals (e.g., composite, HDTV, SDI or other), thereby avoiding altogether the need for expensive and complex triaxial adapters at either end of the connection. Accordingly, baseband television signals designated BCA originate from the camera 48 and are coupled to the camera transceiver unit 46 via cables 50. The electrical signals BCA are converted to optical signal OBCA for transmission downstream on fiber optic cable 30 to the base station transceiver unit 38. In a similar manner, the base station transceiver unit 38 converts baseband television signals designated BCU originated from the video production facility 11. The BCU and BCA signals are carried between the video production facility 11 and the base unit 38 over multiple cables designated 34. The BCU signals are converted to optical signal OBCU which is carried upstream on fiber optic cable 30. The signals are shown in FIG. 3B. It should be understood that the principles of the present approach also apply to embodiments that do not include camera control equipment.

As described further herein, the camera transceiver unit is housed in a housing that has plates on opposite sides that allow the housing to be mounted between a battery and camera.

Figure 4A:
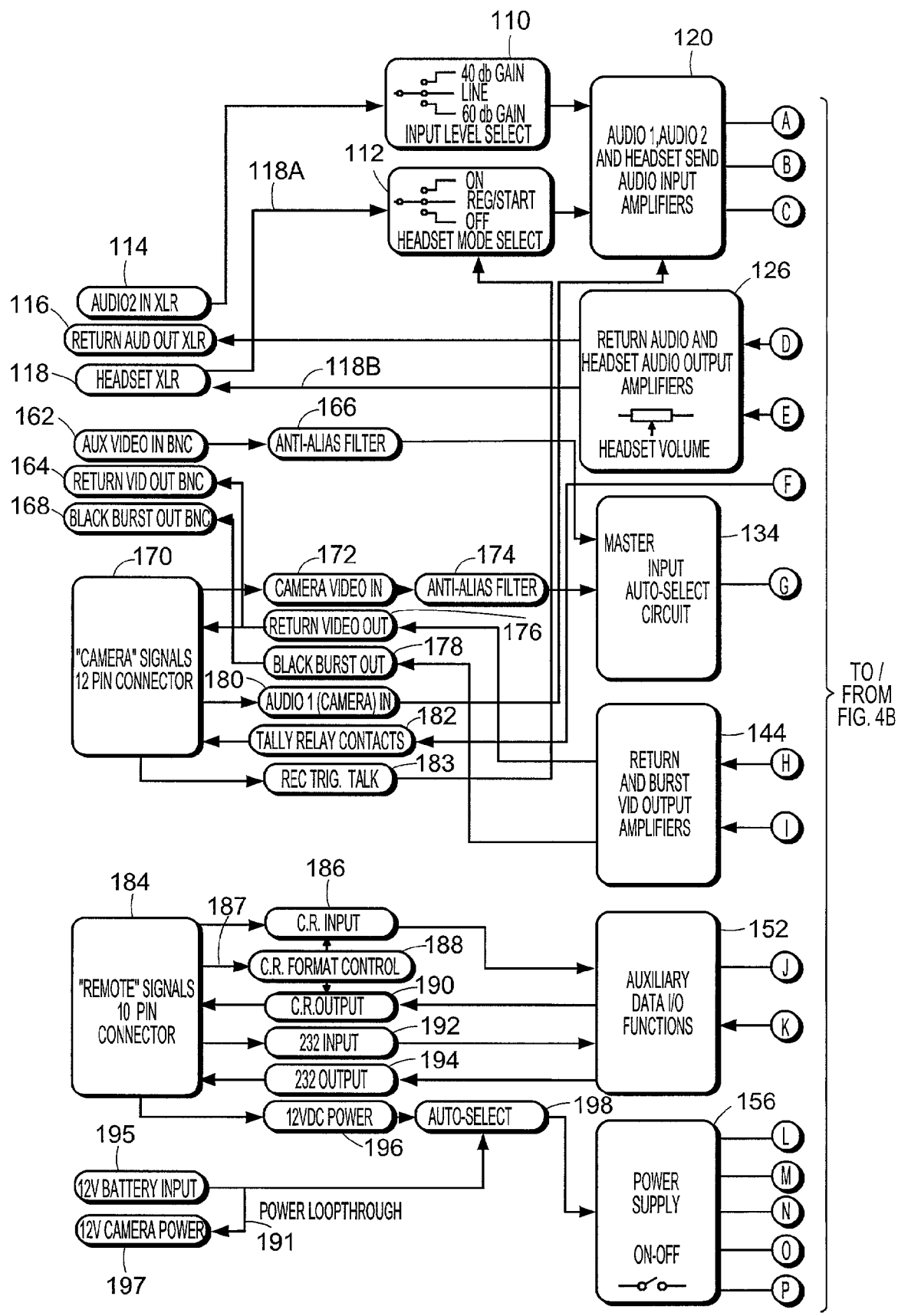
FIGS. 4A and 4B are block diagrams of an embodiment of the camera transceiver unit of the system of FIG. 3A.
Figure 4B:
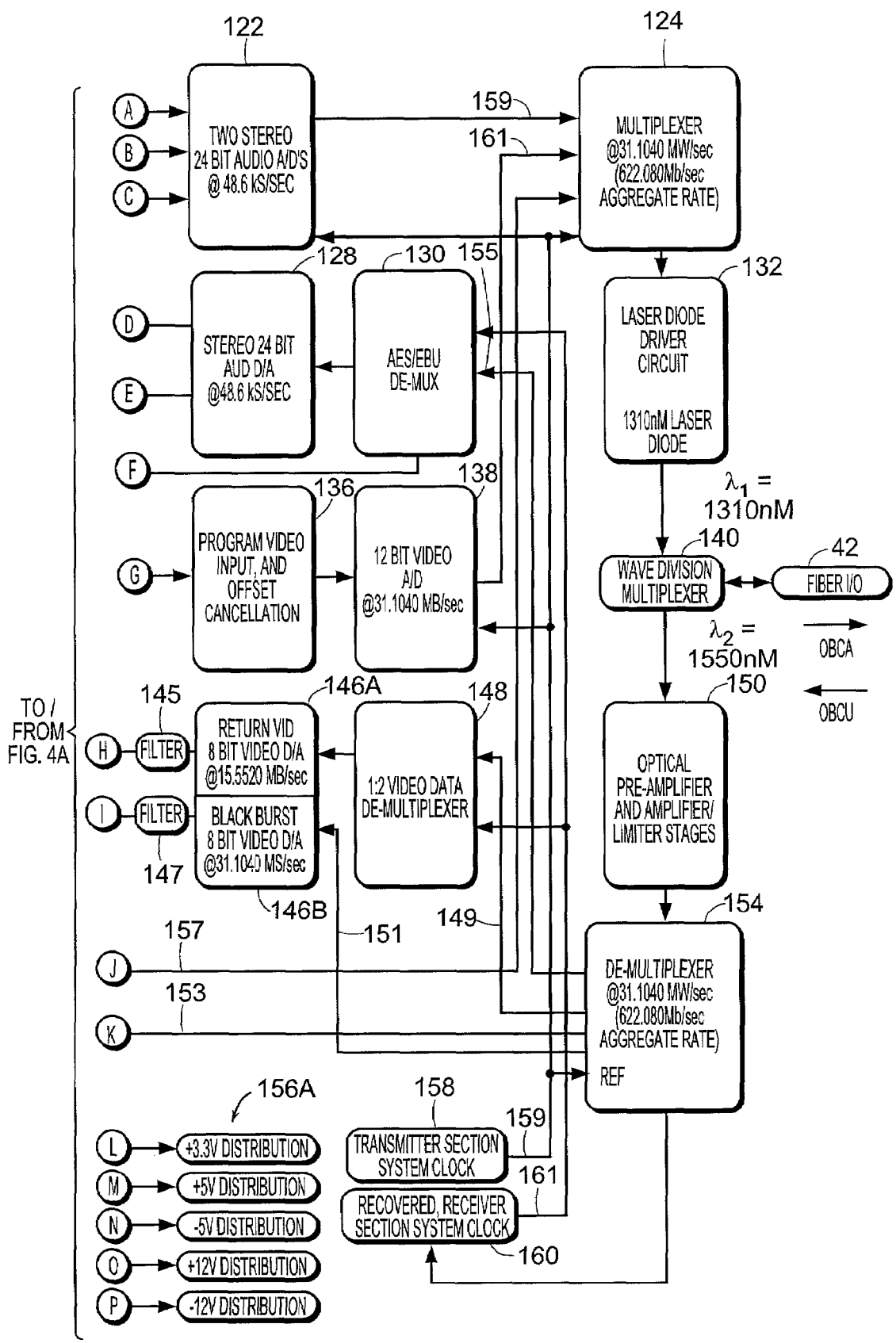

Referring to FIGS. 4A and 4B, a block diagram of an embodiment of the camera transceiver unit 46 is shown and is now described in more detail. The camera transceiver unit connects camera signals on a 12 pin connector 170. The camera signals include camera video in 172; return video out 176; audio 1 (camera) in 180; tally relay contacts 182 and headset trigger signal 183. The return video out signal 176 is coupled to a return video out BNC connector 164. Additional signals from the camera include a black burst out signal 178 coupled to BNC connector 168, an auxiliary video in BNC connector signal 162, headset signals 118A, 118B on XLR connector 118, return audio out XLR signal 116 and an audio 2 input XLR signal 114.

A 10 pin connector 184 provides additional signals to and from the camera. These remote signals include camera remote control input 186, camera remote control output 190, RS232 input 192, RS232 output 194, and a nominal 12 volt DC power signal 196. In addition, a camera remote control format control signal 188 is provided, the function of which is described in further detail below.

The camera unit receives a nominal 12 volt battery input signal 195 from a 12 volt battery pack that is connected to the housing of the camera unit as described further below. An auto-select circuit 198 selects between 12 VDC power signal 196 from the camera and the 12 VDC battery signal 195 to supply a power supply 156 that distributes power via distribution lines 156A. Power loop through 191 connects the 12 VDC battery signal 195 through to the camera from the battery.

The camera video in signal 172 is coupled to an anti-alias filter 174 which removes extraneous signals from the camera video input. Likewise, the auxiliary video in signal 162 is filtered via anti-alias filter 166. The filtered video signals are input to a video auto-select circuit 134. The video auto-select circuit selects between the auxiliary video and the program video signals to provide one of the signals for transmission to the base station unit. The selected video signal is coupled to an off-set cancellation circuit 136 which removes DC off-set in the video signal. The output of the off-set cancellation circuit 136 is input to a 12 bit video analog-to-digital (A/D) converter 138. The video A/D converter circuit 138 samples the composite video signal at 31.1040 mega samples per second with 12 bits per sample.

The audio input signals 114, 118A and 180 are amplified in amplifier circuit 120. For audio 2 input signal 114, input level select circuit 110 provides user-selectable gains of 40 dB and 60 dB for a microphone input or unity gain for line level input. The amplified audio signals are connected to a pair of stereo audio A/D converter circuits 122. The audio A/D converter circuit 122 provides 24 bit samples that are sampled at the rate of 48.6 kilo samples per second. The outputs of the audio A/D converter circuit 122 include a serialized data signal that includes left and right stereo samples, and a left/right indicator signal. Audio 1 signal 180 uses the left channel of one of the stereo A/D converter circuits 122. The headset signal 118 uses the right channel of the first audio A/D circuit. The audio 2 signal is coupled to the second stereo audio A/D converter.

The digital output 161 of the 12 bit video A/D converter circuit 138 and the digital output 159 of the 24 bit audio A/D converter circuits 122 are coupled to a multiplexer 124. The multiplexer multiplexes the signals at a rate of 31.1040 mega words per second resulting in an aggregate bit rate of 622.080 megabits per second. In an embodiment, the multiplexer 124 is a HDMP-1032 multiplexer provided by Hewlett Packard. Additional data inputs to the multiplexer 124 include data signals 157 from remote signal connector 184. The output of the multiplexer 124 is a serial bit stream that is connected to a laser diode driver circuit 132. The laser driver circuit drives a laser diode.

In order to minimize optical fiber usage, the laser diode 132 may be coupled to a wavelength division multiplexer (WDM) 140. The optical signal OBCA produced by the laser diode is at a first wavelength $\lambda_1$, such as 1310 nm. In the opposite direction, the optical signal OBCU from the base station transceiver unit 38 (FIG. 3A) is received at port 42 and may be coupled via the WDM 140. The optical signal OBCU is at a second wavelength $\lambda_2$, such as 1550 nm. In general, the optical wavelengths are preferably selected from wavelengths in the range of 1300 nm to 1550 nm. The WDM 140 splits the optical signals $\lambda_1$ and $\lambda_2$.

In another embodiment, the WDM 140 can instead be a two-way coupler, in which case $\lambda_1=\lambda_2$ with bi-directional transmission on a single optical fiber.

It should be noted that while the preferred embodiment of the present system employs wavelength division multiplexing to provide transmission of optical signals OBCU and OBCA on a single optical fiber, other embodiments of the invention can have a separate optical fiber for each direction of transmission. In such embodiments, the wavelength division multiplexing is not employed, and $\lambda_1$ can be the same as $\lambda_2$.

On the receive side of the wave division multiplexer 140 an optical signal at 1550 nanometers is received on the fiber port 42. This receive optical signal is coupled to an optical pre-amp stage 150 which provides optical amplification to bring the signal to a useful level. The optical pre-amp circuit 150 also includes an optical/electrical converter the output of which is provided to a demultiplexer 154. The digital output of the demultiplexer 154 includes digital video signals 151, 149, data signals 153 and audio signal 155. In an embodiment, the demultiplexer 154 is a HDMP-1034 multiplexer provided by Hewlett Packard.

Video signal 149 is coupled to a 1:2 video data demultiplexer 148. The 1:2 demultiplexer decodes data for the return video that is sampled at half the data rate to use only 4 bits on a corresponding multiplexer at the base station unit 38 (FIG. 3A) as described further herein. The decoded video output from the 1:2 demultiplexer 148 and the digital video signal 151 are 8 bit sample signals that are converted to baseband analog video signals by video D/A converters 146A, 146B. The video D/A converter 146A operates at 15.5520 mega samples per second; the video D/A converter 146B operates at 31.1040 mega samples per second. The baseband analog video signals are filtered by filters 145, 147 and amplified by amplifier block 144 to provide return video out signal 176 and black burst out signal 178.

The audio signal 155 is provided to an AES/EBU demultiplexer circuit 130 which takes serial data from the demultiplexer 154 and converts that serial data into 24 bit sample signals coupled to audio digital-to-analog (D/A) converter circuit 128. The AES/EBU demultiplexer is used to simplify the decoding of the signals by the D/A converter 128. The audio D/A converter 128 operates at 48.6 kilo samples per second. The baseband analog audio signals output from the audio D/A converter 128 are amplified by amplifier block 126 to provide output audio signals 116, 118B.

As noted, the remote signals include a camera remote control input and a camera remote control output signal 186, 190. The camera remote control signals can take on formats that include a bi-directional 2-wire format, RS422, and RS232 format. A format control signal 187 is included in the cable received from the camera in the 10 pin connector 184. Depending on the type of signals used by the camera, a particular cable is pre-made to select a particular format. The selected format is indicated by having one of the pins in the 10 pin connector coupled to ground, 12 volts or left open. The pin state is interpreted by camera remote control format control circuit 188.

An auxiliary data I/O functions block 152 provides input amplifiers for the different data types for camera remote control input 186 and 232 input 192. The data I/O block also provides output levels for the proper data types for 232 output 194 and camera remote control output 190.

The main system clock is derived from the camera system clock 158 (FIG. 4B) which supplies all the clocks for the system. From the data that is received at the base station unit, the base station unit recovers that same clock and uses it as its transmission medium for the data that returns back to the camera unit. Recovered receiver section system clock 160 (FIG. 4B) uses a clock recovered from the base station unit to provide clock to the received side functions in the camera unit.

Figure 5A:
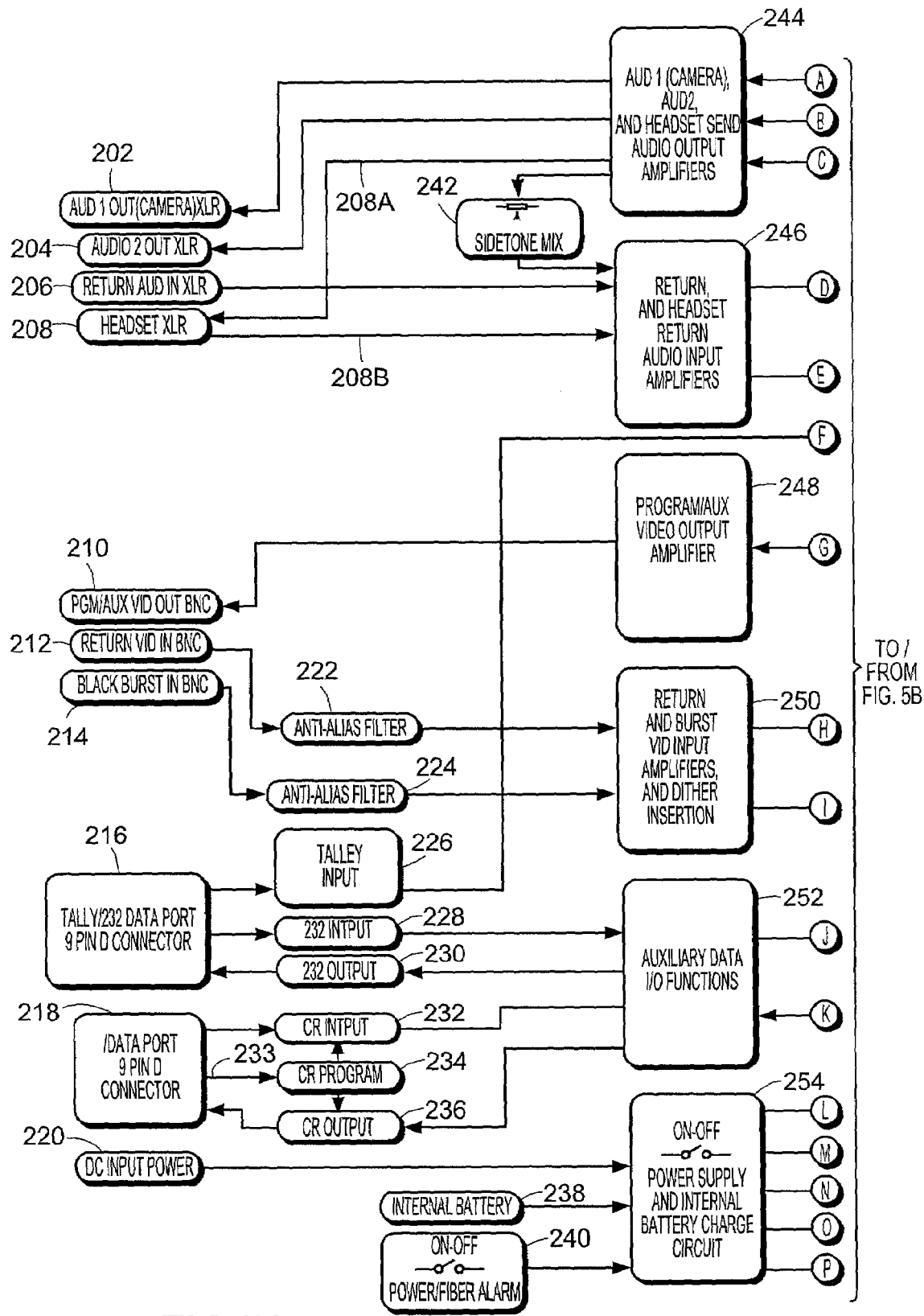
FIGS. 5A and 5B are block diagrams of an embodiment of the base station transceiver unit of the system of FIG. 3A.
Figure 5B:
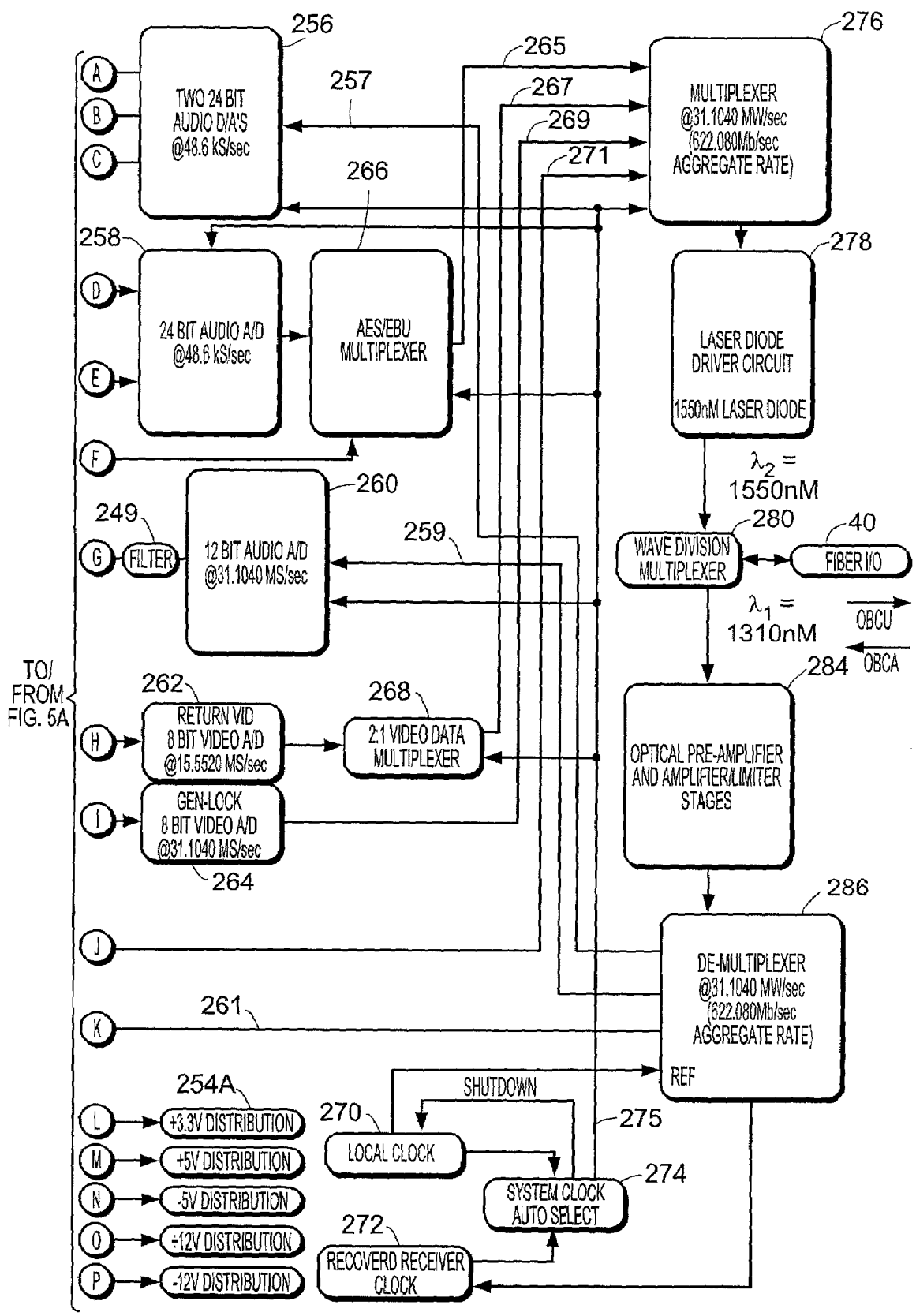

Referring to FIGS. 5A and 5B, a block diagram of the base station transceiver unit 38 is shown and is now described in more detail. The base station transceiver unit 38 provides similar electro-optical functionality to the camera transceiver unit 46 (FIG. 3A). In general, signals between the video production facility 11 and the base station transceiver unit 38 correspond to signals carried to and from the camera transceiver unit 46 on the fiber optic cable 30.

Baseband analog signals received from the video production facility 11 (FIG. 3A) include return video in 212, black burst in 214, return audio in 206 and headset signal 208B on XLR connector 208. The video production facility 11 (FIG. 3A) receives baseband analog signals from the base station transceiver unit that include program/auxiliary video out 210, audio 1 out 202, audio 2 out 204 and headset signal 208A on XLR connector 208.

Additional signals between the video production facility 11 and the base station transceiver unit include tally signal 226 and RS232 data input/output signals 228, 230 through 9 pin D type connector 216, and camera remote control input/output data signals 232, 236 with program signal 233 on data port 9 pin D type connector 218.

The base station transceiver unit receives a DC input power signal 220 that connects to a power supply 254. The power supply also receives an input from an internal battery line 238 and distributes power to lines 254A.

The return video in 212 and black burst in 214 signals are coupled to respective anti-alias filters 222, 224 to remove extraneous signals from the video signals. The filtered video signals are amplified in amplifier block 250 which can also include a dither insertion function. In particular, a dither signal that generally comprises a filtered noise source can be applied to the analog video signal as a means to integrate the steps resulting from the digitizing process. The noise is "shaped" (filtered) so as not to interfere with the analog signal being digitized.

The amplified black burst signal is input to an 8 bit video A/D converter 264 which samples at 31.1040 mega samples per second to provide digital data output signal 269. The amplified return video signal is input to an 8 bit video A/D converter 262 which samples the signal at 15.5520 mega samples per second, half the rate of A/D converter 264. The output of A/D converter 262 is multiplexed in 2:1 video data multiplexer 268 to provide a digital data output signal 267.

The audio input signals 206, 208 plus a sidetone mix signal 242, are amplified in amplifier circuit 246. The amplified audio signals are connected to 24 bit audio A/D converter circuit 258 operating at 48.6 kilo samples per second. An AES/EBU multiplexer 266 receives signals output from the audio A/D converter 258 and multiplexes them together into one serial stream 265 to simplify the transmission of the data. In an embodiment, the AES/EBU multiplexer 266 includes user bits in addition to audio data inputs. The tally signal 226 can be carried as one of the user bits.

An auxiliary data I/O functions block 252 provides input amplifiers for the different data types for camera remote control input 232 and RS232 input 228. The data I/O block also provides output levels for the proper data types for RS232 output 230 and camera remote control output 236.

The encoded digital audio signal 265 is multiplexed together with digital video data outputs 267, 269 and data signals 271 in a multiplexer 276. The multiplexer 276 operates at a rate of 31.1040 mega words per second resulting in an aggregate bit rate of 622.080 mega bits per second. The output of the multiplexer 276 is a serial bit stream that is connected to a laser diode driver circuit 278 that drives a laser diode coupled to a WDM 280. In one embodiment, the optical signal OBCU produced by the laser diode is at wavelength $\lambda_2$, such as 1550 nm. In the opposite direction, the optical signal OBCA from the camera transceiver unit 46 (FIG. 3A) is received at port 40 and may be coupled via the WDM 280. The optical signal OBCA is at wavelength $\lambda_1$, such as 1310 nm. The WDM 280 splits the optical signals $\lambda_1$ and $\lambda_2$.

On the receive side of the wave division multiplexer 280 an optical signal at 1310 nanometers is received on the fiber port 40. This receive optical signal is coupled to an optical pre-amp stage 284 which provides optical amplification to bring the signal to a useful level. The optical pre-amp circuit 284 also includes an optical/electrical converter the output of which is provided to a demultiplexer 286. The digital output of the demultiplexer 286 includes digital audio signal 257, digital video signal 259 and data signal 261.

The digital audio signal 257 is provided to two 24 bit audio D/A converters 256 which converts the signal 257 to provide analog audio 1 signal 202, audio 2 signal 204 and headset signal 208A. An amplifier circuit 244 provides gain for these audio output signals and provides the sidetone mix signal 242.

The digital video signal 259 is coupled to a 12 bit video D/A converter 260 that operates at 31.1040 mega samples per second. The baseband analog video output from the D/A converter 260 is filtered by filter 249 and amplified by amplifier block 248 to provide program/auxiliary video output signal 210.

The data signal 261 is coupled to the auxiliary data I/O block 252 to provide the proper levels to the video production facility 11 (FIG. 3A).

At initial power up of the base station transceiver unit, system clock for the base unit is provided by local clock 270. After a period of operation, the base unit recovers clock from the data received from the camera transceiver unit and subsequently the base unit switches from the local clock 270 to recovered clock 272 using an auto select circuit 274.

Having described the electrical and optical functions of the present system, the mechanical aspects are now described in further detail.

Figure 6A:
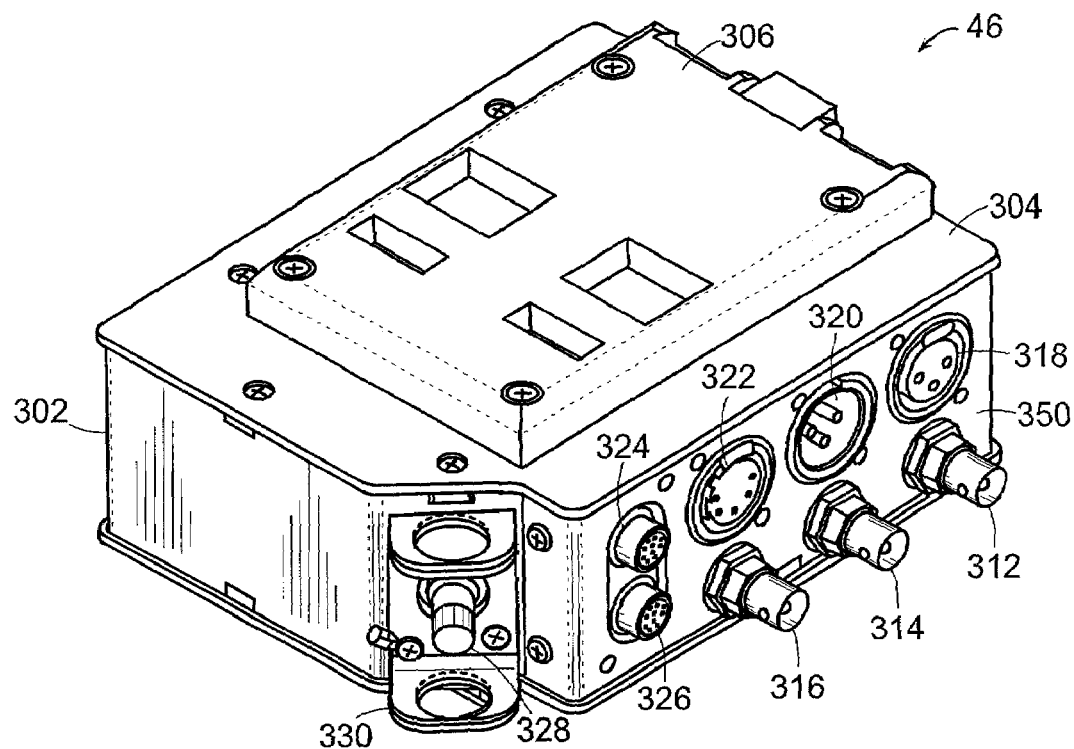
FIG. 6A is a perspective view of an embodiment of a housing for the camera transceiver unit.
Figure 6B:
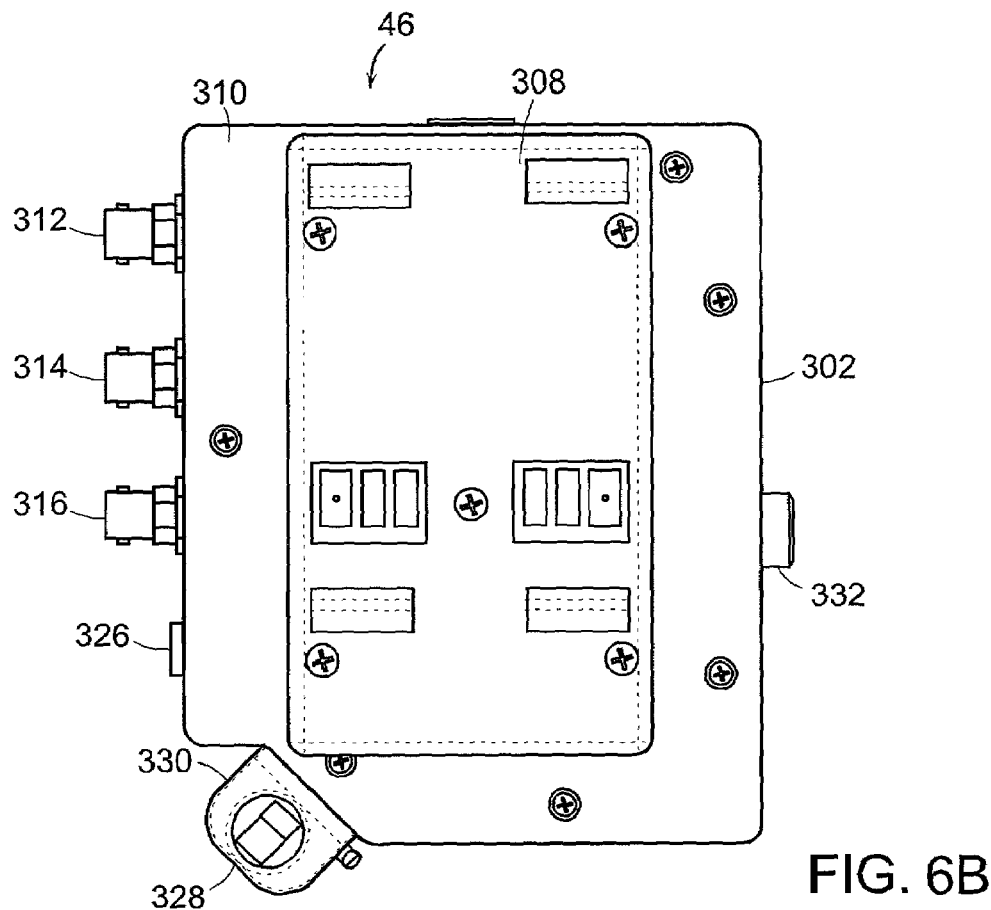
FIG. 6B is a right side view of the housing of FIG. 6A.

FIG. 6A shows a perspective view of an embodiment of a housing 302 for the camera transceiver unit 46. FIG. 6B shows a right side view of the housing. A front panel 350 of the housing includes BNC connectors 312, 314, 316; XLR connectors 318, 320, 322; Hirose connectors 324, 326. Other connector arrangements are possible and the particular configuration is shown for illustration purposes only. An ST type or other type fiber cable receptacle 328 is positioned at a 45 degrees angle below the front panel. Rails 330 protect the fiber cable receptacle.

A left side 304 of the housing includes a mounting plate 306 (FIG. 6A). A second mounting plate 308 is attached on the opposite side 310. The plates 306, 308 shown are of the PAG battery mount type. However, it should be understood that other types of battery mounting systems can be used with the principles of the present system, including those mounting systems provided by Anton/Bauer, Sony and others.

Figure 7:
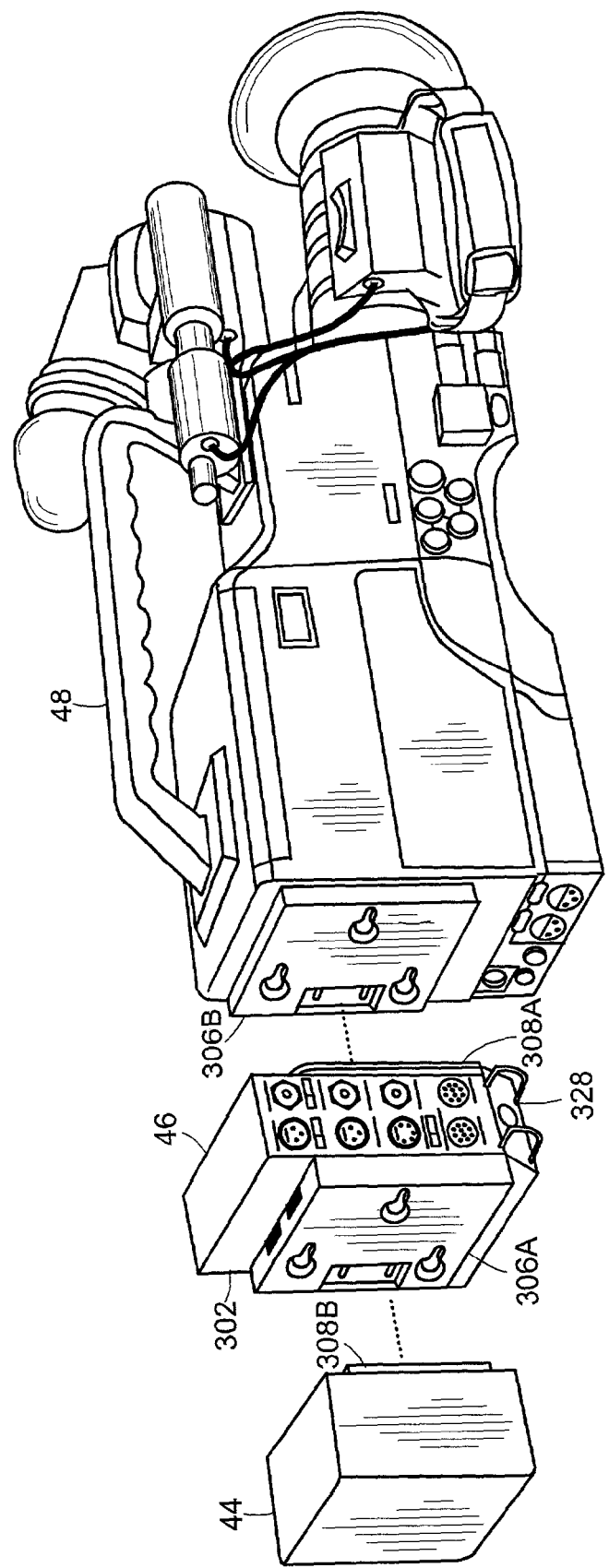
FIG. 7 illustrates a partially exploded view of a configuration for mounting the camera transceiver unit between a camera and a battery system.

FIG. 7 illustrates a configuration of the camera transceiver unit 46 aligned for mounting between camera 48 and power source or battery 44. In this configuration, plates 306A, 306B and 308A, 308B are shown as Anton/Bauer "Gold Mount" type, though as noted, other types of battery mounting systems can be used. In a typical arrangement without the present transceiver system, plate 308B of the power source 44 mounts to plate 306B attached to the camera 48. With the present system, the housing 302 is aligned between the camera 48 and the power source 44 such that plates 308B, 306A are connected. Likewise, plates 308A, 306B are connected. As configured and as described above, the camera transceiver unit 46 is capable of tapping 12 VDC from the power source 44 and passing power through to the camera 48.

Use of standard or other types of battery mounting systems to mount the housing between the camera and the battery provides several advantages. One advantage includes enabling a user to quickly, effectively and easily remove and replace the fiber optic transceiver. Another advantage is that the fiber optic transceiver housing maintains the same operational advantages for battery pack connections without replacing or upgrading ENG/EFP camera equipment.

While this invention has been particularly shown and described with references to preferred embodiments thereof, it will be understood by those skilled in the art that various changes in form and details may be made therein without departing from the scope of the invention encompassed by the appended claims.

What is claimed is:

1. A transceiver that provides an interface between a television camera and a fiber optic cable, where the television camera transmits one or more input baseband television signals and receives one or more output baseband television signals, and the fiber optic cable carries one or more output optical signals from the transceiver and one or more input optical signals to the transceiver, the transceiver comprising:

a transmitter that receives the input baseband television signals, converts the input baseband television signals into the output optical signals, and transmits the output optical signals to the fiber optic cable, wherein the input baseband television signals are not arranged in a frequency division multiplex format;

a receiver that receives the input optical signals, converts the input optical signals into the output baseband television signals, and transmits the output baseband television signals to the television camera, wherein the output baseband television signals are not arranged in a frequency division multiplex format;

a housing that contains the transmitter and the receiver, the housing having features that configure it to be directly or indirectly coupled to one or more features on the television camera; and a circuit that selects a power source for the transceiver from one of a nominal 12 volt direct current signal from the television camera and a nominal 12 volt direct current signal from a battery, where the battery is directly coupled to the housing.

2. The transceiver of claim 1, wherein the housing includes a first mounting structure located on a first side that mounts the housing to the television camera and a second mounting structure on a second side that mounts the housing to the battery.

3. The transceiver of claim 1, further comprising a fiber input/output port coupled to the fiber optic cable.

4. The transceiver of claim 3, further comprising a wave division multiplexer coupled to the fiber input/output port for multiplexing the input optical signals and the output optical signals to permit bidirectional communication on the fiber optic cable.

5. The transceiver of claim 1, wherein the input baseband television signal includes a video signal.

6. The transceiver of claim 1, wherein the input baseband television signal includes an audio signal.

7. The transceiver of claim 1, wherein the input baseband television signal includes a data signal.

8. The transceiver of claim 1, wherein the output baseband television signal includes a video signal.

9. The transceiver of claim 1, wherein the output baseband television signal includes an audio signal.

10. The transceiver of claim 1, wherein the output baseband television signal includes a data signal.

11. The transceiver of claim 1, further comprising a multiplexer that multiplexes the input baseband television signals into a multiplexed input baseband television signal, and an electrical-to-optical converter that converts the multiplexed input baseband television signal into the output optical signal.

12. The transceiver of claim 1, further comprising an optical-to-electrical converter that converts the input optical signal into a multiplexed output baseband television signal and a demultiplexer that demultiplexes the multiplexed output baseband television signal into the output baseband television signal.

13. An apparatus comprising:

a housing that contains a transceiver, the housing have a first mounting structure located on a first side of the housing, a second mounting structure located on a second side of the housing, and features that configure the housing to be directly coupled to one or more mating features on a fiber optic cable, where the fiber optic cable carries one or more output optical signals from the transceiver and one or more input optical signals to the transceiver;

a television camera mounted to the first mounting structure of the housing, where the television camera transmits one or more input baseband television signals and receives one or more output baseband television signals;

the transceiver comprises a transmitter and a receiver, where the transmitter receives the input baseband television signals, converts the input baseband television signals into the output optical signals, and transmits the output optical signals to the fiber optic cable, and the receiver receives the input optical signals, converts the input optical signals into the output baseband television signals, and transmits the output baseband television signals to the television camera, and the input baseband television signals and the output baseband television signals are not arranged in a frequency division multiplex format; and a circuit that selects a power source from one of a nominal 12 volt direct current signal from the television camera and a nominal 12 volt direct current signal from a battery mounted to the second mounting structure of the housing.

14. A system that provides an interface between a television camera and a video production facility, where the video production facility transmits and the television camera receives one or more output baseband television signals, and the television camera transmits and the video production facility receives one or more input baseband television signals, wherein the input baseband television signals and the output baseband television signals are not arranged in a frequency division multiplex format, the system comprising:

a first transceiver mounted to the television camera;

a second transceiver coupled to the video production facility;

a fiber optic cable coupled between the first transceiver and the second transceiver;

where the first transceiver converts the input baseband television signals from the television camera into an output optical signal, and transmits the output optical signal to the second transceiver over the fiber optic cable, and the second transceiver converts the output optical signal from the first transceiver into the input baseband television signal and transmits the input baseband television signal to the video production facility; and where the second transceiver converts the output baseband television signals from the video production facility into an input optical signal, and transmits the input optical signal to the first transceiver over the fiber optic cable, and the first transceiver converts the input optical signal from the second transceiver into the output baseband television signal and transmits the output baseband television signal to the television camera.

15. The system of claim 14, where the first transceiver is contained in a housing, the housing including a first mounting structure located on a first side of the housing and a second mounting structure located on a second side of the housing, where the television camera is mounted to the first mounting structure of the housing.

16. The system of claim 15, further including a battery mounted to the second mounting structure of the housing.

17. The system of claim 16, where the first transceiver is powered by a nominal 12 volt direct current signal from the battery.

18. The system of claim 14, where the first transceiver is powered by a nominal 12 volt direct current signal from the television camera.

* * * * *